No. 617,578. Patented Jan. 10, 1899.
J. A. KELLY.
BICYCLE OR SIMILAR MACHINE.
(Application filed May 26, 1897.)
(No Model.) 2 Sheets—Sheet 1.
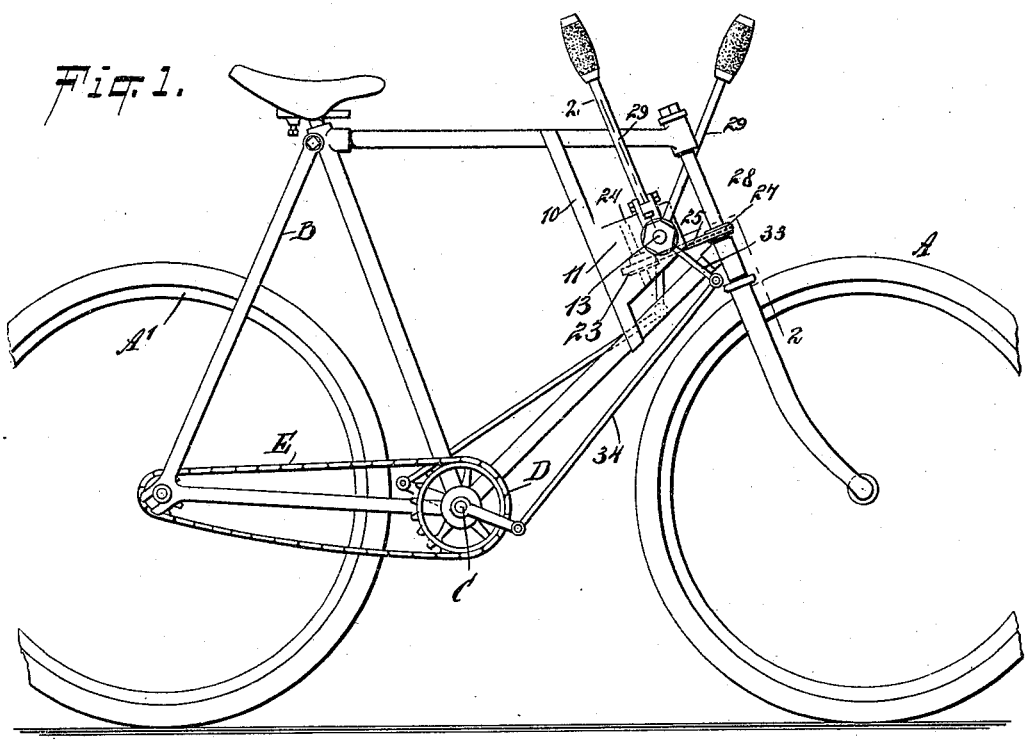
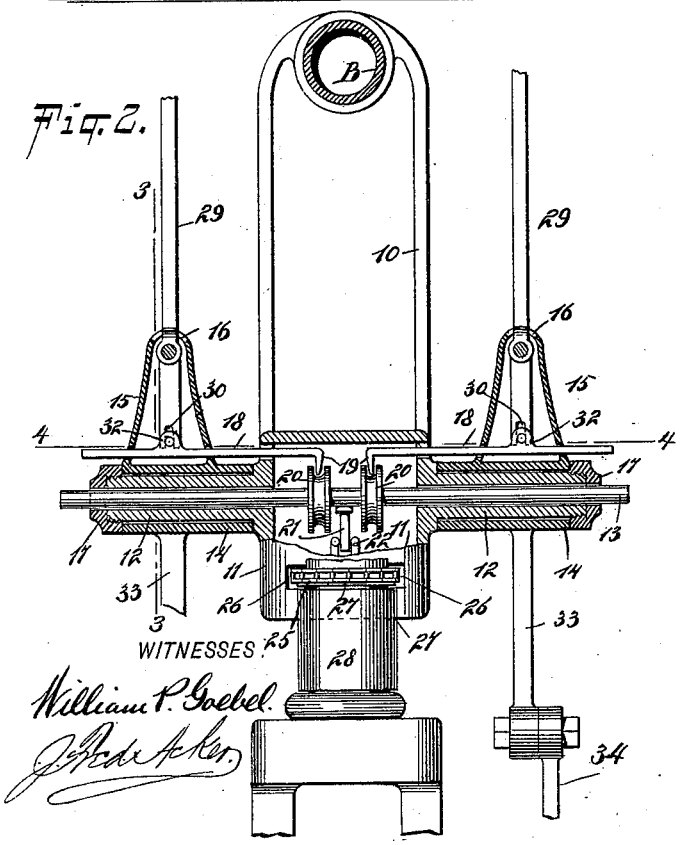
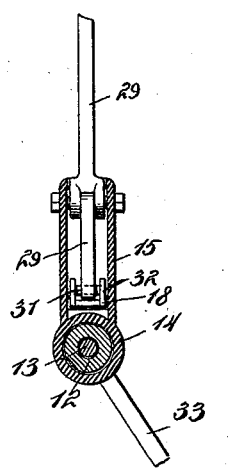
WITNESSES
William P. Goebel
J. Fred Acker
INVENTOR
J. A. Kelly.
BY
ATTORNEYS.

No. 617,578. Patented Jan. 10, 1899.
J. A. KELLY.
BICYCLE OR SIMILAR MACHINE.
(Application filed May 26, 1897.)
(No Model.) 2 Sheets—Sheet 2.
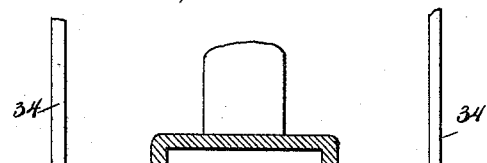
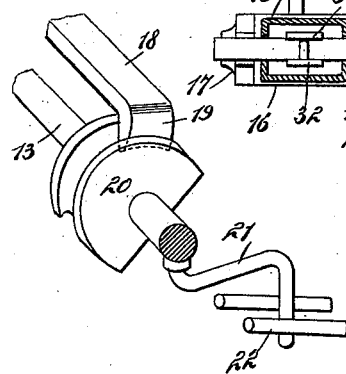
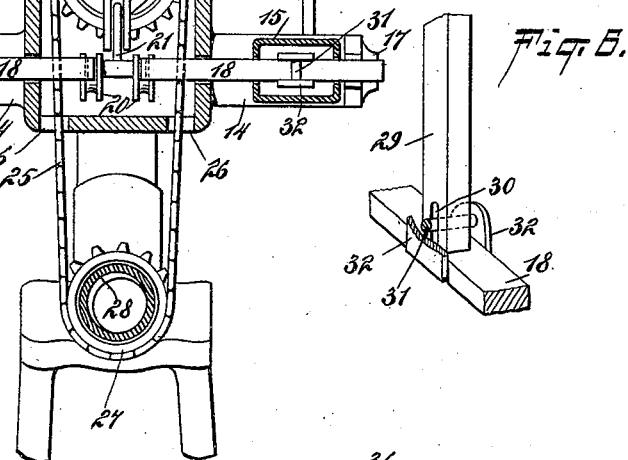
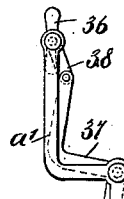
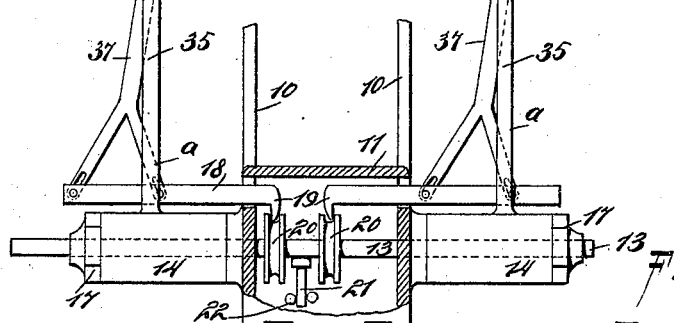
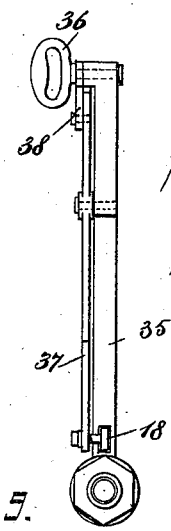
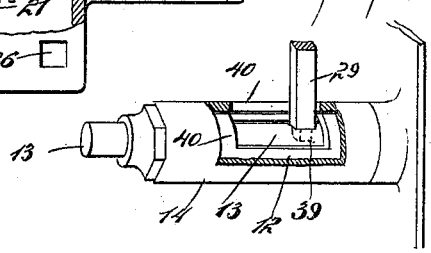
WITNESSES
William P. Goebel.
J. Fed Acker.
INVENTOR
J. A. Kelly.
BY
ATTORNEYS.
THE NORRIS PETERS CO., PHOTO-LITHO., WASHINGTON, D. C.

UNITED STATES PATENT OFFICE.

JOHN A. KELLY, OF NEW YORK, N. Y.

BICYCLE OR SIMILAR MACHINE.

SPECIFICATION forming part of Letters Patent No. 617,578, dated January 10, 1899.

Application filed May 26, 1897. Serial No. 638,218. (No model.)

*To all whom it may concern:*

Be it known that I, JOHN A. KELLY, of New York, (Brooklyn,) in the county of Kings and State of New York, have invented a new and useful Improvement in Bicycles or Similar Machines, of which the following is a full, clear, and exact description.

My invention relates to bicycles, tricycles, and other vehicles wholly or partly driven by hand-power; and the object of the invention is to provide a construction whereby it will be possible to use the hands at the same moment both for driving and steering purposes, or for either purpose, as required.

Another object of the invention is to accomplish the above-named results by a mechanism which will be exceedingly simple, durable, and economic.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a bicycle having the improvement applied. Fig. 2 is a vertical section taken substantially on the line 2 2 of Fig. 1. Fig. 3 is a section taken practically on the line 3 3 of Fig. 2. Fig. 4 is a horizontal section taken practically on the line 4 4 of Fig. 2. Fig. 5 is a detail perspective view of a portion of the shifting or steering device. Fig. 6 is a detail perspective view illustrating the connection between the propelling-levers and the shifting or steering rods. Fig. 7 is a vertical section through a portion of the casing which is attached to the machine-frame and illustrates in side elevation a slight modification in the driving and steering device. Fig. 8 is a side elevation of one of the driving or hand levers shown in Fig. 7 and the steering-lever used in connection therewith, and Fig. 9 is a perspective view illustrating a modification in the steering device for the machine.

A and A' represent the wheels of the machine, and B the frame generally. An upright brace 10 is made to extend from the upper brace or top tube of the frame to the lower or main brace, as shown in Figs. 1 and 2, the uprights being duplicated at each side of the machine, and these uprights combinedly serve to hold a forwardly-extending hollow frame 11, having collars 12, projected one from each of its sides, as shown in Fig. 2. A shifting shaft 13 is loosely passed through the said collars 12 and through the chamber of the frame 11, and around each collar 12 a sleeve 14 is mounted to turn, each sleeve being provided with a tubular extension 15, having a transverse slot 16 in its upper end. The sleeves are held against end movement on the collars by means of suitable nuts 17, through which the ends of the shaft 13 extend.

A shifting or steering rod 18 is held to slide longitudinally from each of the sleeves 14 in openings made in the extensions 15 of the sleeves, and each shifting or steering rod at its inner end terminates in a head 19, which is at an angle to the body of the rod. The head of each shifting or steering rod is made to enter a peripheral groove in a wheel 20 or a segment of a wheel, two of which are secured upon the shaft 13 within the chamber of the casing 11, one at each side of the center of said shaft.

At a point between the two wheels or segments 20 a crank-arm 21 is downwardly carried from said shaft 13, as shown in Fig. 5, and said crank-arm is made to enter between guide-rods 22 or their equivalents, which rods are secured upon the upper face of a sprocket-wheel 23, as shown in Fig. 4. The sprocket-wheel 23 is mounted to turn upon a shaft 24, located in the casing or frame 11, and a belt 25, preferably a chain belt, is passed around the sprocket-wheel 23, out through openings 26 made in the front portion of the frame or casing 11, and around, preferably, a smaller sprocket-wheel 27, which is secured to the steering-post 28 of the machine; but instead of said chain and sprocket any well-known mechanism suitable for the purpose may be employed to cause the actuating of the steering-wheel by the transverse motion of the steering-bars 18 and the shifting shaft 13.

A hand-lever 29 is pivoted in each extension 15 of each sleeve 14, and the bottom of each lever 29, as shown in Fig. 6, is provided with a slot or a recess 30. The slots or recesses in the hand-levers 29 receive pins 31, which are secured in ears 32, extending upward from the shifting rods or bars 18.

Opposite the point of each sleeve 14, where the extensions 15 are located, a downwardly and usually a forwardly extending arm 33 is placed, as shown in Figs. 1 and 2, and these arms 33 are pivotally connected by rods 34 with the cranks on the pedal-shaft C of the machine; but the connection between the pedal-shaft and the sleeves 14 may be made in any other well-known manner.

In operation the hand-levers are grasped and worked alternately backward and forward, whereupon a rotary motion is conveyed to the pedal-shaft C, which is shown as carrying the usual sprocket D, connected by a chain E with the axle of the rear wheel of the machine. In this manner all of the force of the muscles of the arms, back, and shoulders is utilized in driving the machine, and at any time that it is desirable to turn the machine to the right or to the left the hand-levers are given movement laterally or in a transverse direction, which will move the shaft 13 either to the right or to the left, and thereby produce a partial revolution of the steering-post 28. The shifting or steering rods are constantly in engagement with the shaft 13, so that even while the machine is being propelled it may be steered to the right or to the left.

In the modified form of the invention shown in Fig. 7 all the parts remain the same as heretofore described with the exception of the hand-levers. The hand-levers in the modified form are designated as 35 and are of angular construction, embracing a lower straight portion $a$ and an upper substantially L-shaped section $a'$. The lower section $a$ of each hand-lever is permanently attached to a sleeve 14, and at the upper end of each of the hand-levers a handle 36 is pivoted or is mounted to turn. A shifting lever 37 is pivoted at or near its center upon each hand-lever, preferably where the two sections of the hand-levers connect. The shifting levers 37 are of the same shape as the hand-levers, and each shifting lever is pivotally attached to a link 38, the said links being secured each to a handle 36 in a manner to turn with the handles. The lower ends of the shifting levers 37 are attached one to each shifting bar 18, and said shifting bars are held to slide through openings made in the hand-levers, as shown in Fig. 8. Under this form of hand-lever the levers proper are used for propelling the machine, and by simply turning either of the handles 36 connected with the hand-levers the shifting lever 37 belonging to that particular hand-lever will instantly act upon the shifting rod or bar 18 with which it is connected.

A further modification is shown in Fig. 9, in which the hand-levers shown in Figs. 1, 2, and 3 may be employed; but instead of the hand-levers connecting with shifting rods or bars 18 said hand-levers are made to enter openings 39 produced in the shaft 13, and to that end longitudinal and registering openings 40 are made in the sleeves 14 and in the collars 12.

Having thus described my invention, I claim as new and desire to secure by Letters Patent—

1. In a bicycle or like machine, wholly or partly driven by hand-levers, a shaft or bar connected with the driving-levers and with the steering-wheel, and having endwise movement in a direction transverse to the frame of the vehicle to effect the steering, the said bar or rod being operated for steering purposes by moving the propelling-levers in a line transverse to the line of their driving motion, substantially as described.

2. In a bicycle or like machine propelled wholly or partly by two hand-levers capable of alternate action, a shaft or bar arranged for actuating the steering mechanism and having endwise movement for steering purposes in a direction transverse to the frame of the machine, said shaft or bar passing through the centers of the two circles of which the said hand-levers describe arcs when in use as drivers, the shaft or bar being actuated by the hand-levers, substantially as shown and described.

3. In a bicycle or like machine, the combination of hand-levers mounted to have alternate backward and forward motion for driving purposes, and motion in a direction transverse to the plane of driving motion for steering purposes, a shaft or bar having transverse motion through the center of that circle of which the levers describe an arc when driving, the said shaft or bar being actuated by the transverse movement of the levers, and a connection between the said transversely-extending shaft or bar and the steering-wheel of the machine, whereby the transverse steering action of the levers will operate to turn the steering-wheel of the machine, substantially as shown and described.

4. In a bicycle or like machine driven wholly or partly by hand-power, the combination with a transversely-extending shifting shaft supported to have end movement and arranged for actuating the steering mechanism, sleeves mounted to turn at the ends of said shaft and held against end movement, a connection between the said sleeves and the pedal-shaft, hand-levers connected with said sleeves, and means for operating the shifting shaft from said hand-levers, substantially as set forth.

5. In a bicycle or like machine, a casing supported on the frame of the machine, collars projecting from each side of said casing, a transversely-extending shaft passing loosely through said collars and the chamber of the casing, a connection between the said shaft and the steering-post of the machine, a sleeve mounted to turn on each of said collars, an arm extending from each sleeve, rods pivotally connecting said arms with the cranks on the pedal-shaft, hand-levers arranged to turn the said sleeves, and means for operating the shifting shaft from the hand-levers, as set forth.

6. In a bicycle or like machine driven wholly or partly by hand-power, a transversely-extending shifting shaft, a fixed support in which the said shaft has end movement, a shifting wheel actuated by the movement of said shifting shaft, a connection between the shifting wheel and steering-post of the machine, sleeves mounted to turn on that part of the fixed support through which the said shaft passes, and hand-levers connected with the said sleeves, the said hand-levers or parts thereof being capable of lateral movement and arranged to impart movement to the said shifting shaft, substantially as described.

7. In a bicycle or like machine, a transversely-extending shaft, supports in which said shaft has end movement, a connection between the said shaft and the steering-post of a bicycle, hand-levers, bars or rods arranged for actuating the shifting shaft, said bars or rods having effective action in a direction transverse to the direction of movement of the hand-levers when in use as propellers and a connection between the hand-levers and said bars or rods for steering purposes as specified.

8. In a bicycle or like machine, driven wholly or partly by hand-power, a transversely-extending shifting shaft or bar mounted loosely in a fixed support and capable of end movement therein, the said shaft being arranged to actuate the steering mechanism of the machine, and transversely-extending rods or bars having end movement and operatively connected at their inner ends with the said shifting shaft, the said rods or bars being operated by the hand-levers or parts thereof, substantially as described.

9. In a bicycle or like machine, the combination with hand-levers, and a driving connection between the hand-levers and a supporting-wheel of the machine, of a shifting shaft, wheels secured upon said shifting shaft and provided with peripheral grooves, shifting rods or bars, each terminating at its inner end in a head adapted to enter the peripheral groove in the respective wheel on the shifting shaft, an arm extending from said shifting shaft at a point between the said wheels, a shifting wheel mounted to turn and provided with guides between which the said arm extends, and a connection between the shifting wheel and steering-post, the said hand-levers being arranged to actuate the shifting rods or bars, substantially as set forth.

10. In a bicycle or like machine, a hollow frame or casing supported on the framework of the machine, a shifting wheel mounted to turn in said casing and connected with the steering-post of the machine, a shaft extending loosely through said casing and capable of end movement therein, the said shaft being arranged to operate the shifting wheel, shifting bars or rods extending into the said casing and arranged to operate the said shifting shaft, and hand-levers or parts thereof arranged to actuate said shifting bars or rods, substantially as set forth.

11. In a bicycle or like machine, a casing supported on the frame of the machine, a shifting shaft passing loosely through said casing, an arm extending from said shifting shaft within the casing, a shifting wheel mounted to turn within the casing and provided with guides between which the said arm on the shifting shaft extends, a connection between the shifting wheel and steering-post, hand-levers arranged for driving connection with a wheel of the machine, and means for operating said shifting shaft from the hand-levers, substantially as described.

12. In a bicycle or like machine, a casing supported on the frame of the machine, collars projecting from each side of said casing, a shifting shaft passing loosely through said collars and the chamber of the casing, a sleeve mounted to turn on each of said collars, a driving connection between the said sleeve and the crank-shaft, hand-levers arranged to turn said sleeves, an arm extending from said shifting shaft within the casing, a shifting wheel mounted to turn within the casing and provided with guides between which the said arm on the shifting shaft extends, a connection between the shifting wheel and steering-post, shifting or steering rods or bars extending into the casing at opposite sides thereof and arranged for actuating the said shifting shaft, and means for operating said shifting bars or rods from the hand-levers, substantially as described.

13. In a bicycle or like machine, a transversely-extending shifting shaft, a fixed support in which said shaft has end movement, a connection between said shaft and the steering-post of the machine, sleeves surrounding that part of the support through which the ends of the said shifting shaft pass, a connection between said sleeves and a supporting-wheel of the machine, levers arranged to turn said sleeves, and means for operating said shifting shaft from the said levers, substantially as described.

JOHN A. KELLY.

Witnesses:
HERBERT P. DEDRICK,
GEORGE H. THOMPSON.